US009190632B2

(12) United States Patent
Tsujiko et al.

(10) Patent No.: US 9,190,632 B2
(45) Date of Patent: Nov. 17, 2015

(54) POWER STORAGE DEVICE USABLE AT LOW TEMPERATURES

(75) Inventors: Akira Tsujiko, Toyota (JP); Koji Takahata, Toyota (JP); Hironori Harada, Toyota (JP); Hideyasu Kawai, Toyota (JP); Hideyuki Yamamura, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1090 days.

(21) Appl. No.: 12/597,183

(22) PCT Filed: Apr. 3, 2008

(86) PCT No.: PCT/JP2008/057052
§ 371 (c)(1),
(2), (4) Date: Oct. 23, 2009

(87) PCT Pub. No.: WO2008/136248
PCT Pub. Date: Nov. 13, 2008

(65) Prior Publication Data
US 2010/0136461 A1  Jun. 3, 2010

(30) Foreign Application Priority Data
Apr. 26, 2007 (JP) ................................. 2007-117203

(51) Int. Cl.
*H01M 6/00* (2006.01)
*H01M 2/02* (2006.01)
(Continued)

(52) U.S. Cl.
CPC ............ *H01M 2/0245* (2013.01); *H01M 2/043* (2013.01); *H01M 2/1077* (2013.01); *H01M 8/247* (2013.01); *H01M 8/248* (2013.01); *H01M 16/003* (2013.01); *H01G 9/08* (2013.01); *H01G 9/155* (2013.01); *H01M 10/0525* (2013.01); *H01M 10/30* (2013.01); *H01M 10/345* (2013.01);
(Continued)

(58) Field of Classification Search
CPC . H01M 2/0245; H01M 2/043; H01M 2/1077; H01M 8/247; H01M 16/003; H01M 8/248; H01M 10/30; H01M 10/345; H01G 9/08; H01G 9/155; Y02T 10/7022; Y02T 10/7011; Y02E 60/50
USPC .......................... 429/129, 130, 148, 154, 247
See application file for complete search history.

(56) References Cited

U.S. PATENT DOCUMENTS 6,037,079 A * 3/2000 Tanaka et al. .................. 429/142
6,653,003 B1 * 11/2003 Tsai et al. ...................... 429/406

(Continued)

FOREIGN PATENT DOCUMENTS

| JP | 7-86673 | 3/1995 |
| JP | 2001-167745 | 6/2001 |

(Continued)

*Primary Examiner* — Gary Harris
(74) *Attorney, Agent, or Firm* — Finnegan, Henderson, Farabow, Garrett & Dunner LLP

(57) ABSTRACT

A power storage device includes a fuel cell (33), a battery holder (1) and an end plate (40) for sandwiching and binding the fuel cell, and an interposed member (11) disposed between the end plate (40) and the fuel cell (33). The battery holder (1) and the end plate (40) are made of resin, and have a positive coefficient of thermal expansion at a temperature lower than a predetermined temperature. The interposed member (11) is formed to have a substantially negative coefficient of thermal expansion at a temperature lower than the predetermined temperature.

7 Claims, 8 Drawing Sheets

(51) Int. Cl.
*H01M 2/04* (2006.01)
*H01M 2/10* (2006.01)
*H01M 8/24* (2006.01)
*H01M 16/00* (2006.01)
*H01G 9/08* (2006.01)
*H01G 9/00* (2006.01)
*H01M 10/0525* (2010.01)
*H01M 10/30* (2006.01)
*H01M 10/34* (2006.01)

(52) U.S. Cl.
CPC .............. *Y02E 60/50* (2013.01); *Y02T 10/7011* (2013.01); *Y02T 10/7022* (2013.01)

(56) References Cited

U.S. PATENT DOCUMENTS

2009/0087720 A1\* 4/2009 Okabe et al. .................... 429/34
2010/0098979 A1\* 4/2010 Imamura ........................ 429/24

FOREIGN PATENT DOCUMENTS

| JP | 2001-507856 | 6/2001 |
| JP | 2001-229897 | 8/2001 |
| JP | 2003-142052 | 5/2003 |
| JP | 2004-139924 | 5/2004 |
| JP | 2005-116429 | 4/2005 |
| JP | 2006-156392 | 6/2006 |

\* cited by examiner ly tightly in a manufacturing stage, the binding load may be reduced under use in a low temperature environment, which may affect the performance of the power storage equipment. For example, the use of the power storage device in a low temperature environment may result in reduced outputs from the fuel cells.

POWER STORAGE DEVICE USABLE AT LOW TEMPERATURES

CROSS-REFERENCE TO RELATED APPLICATIONS

This application is a national phase application of International Application No. PCT/JP2008/057052, filed Apr. 3, 2008, and claims the priority of Japanese Application No. 2007-117203, filed Apr. 26, 2007, the contents of both of which are incorporated herein by reference.

TECHNICAL FIELD

The present invention relates to a power storage device.

BACKGROUND ART

Electric vehicles utilizing an electric motor as a power source and hybrid vehicles utilizing a combination of an electric motor as a power source with another power source (e.g., an internal combustion engine or a fuel cell) have become commercially available. These vehicles are equipped with a power storage device for supplying electric power as energy to the electric motor. The power storage device includes power storage equipment such as a secondary battery, a capacitor or the like that can be charged and discharged repeatedly. The secondary battery is implemented by a fuel cell such as a nickel-cadmium battery, a nickel-hydrogen battery or a lithium ion battery.

Some power storage devices include a single power storage cell, while others include a power storage module in which a plurality of power storage cells are fixed integrally. In a power storage device, a power storage module is housed in a case, for example. Since the power storage module includes a plurality of power storage cells, a large current and a high voltage can be obtained (cf. Japanese Patent Laying-Open No. 2006-156392, Japanese Patent Laying-Open No. 2005-116429 or Japanese Patent Laying-Open No. 2004-139924).

DISCLOSURE OF THE INVENTION

The power storage module includes binding members disposed between power storage cells and at its opposite ends, respectively. The power storage module includes a stacked body in which power storage cells and binding members are stacked alternately, for example. The stacked body is held integrally by fixing the binding members at the opposite ends to each other with fixing members such as round bars.

When fixing the stacked body with the fixing members, a load is applied in the direction that the binding members at the opposite ends approach each other. The fixing members fix the stacked body such that the stacked body has a constant length in the longitudinal direction, for example.

The binding members may contract as the temperature drops, depending on their material, shape and the like. For example, binding members made of resin or the like having a positive coefficient of thermal expansion contract as the temperature drops. Such binding members are reduced in volume at a low temperature. Accordingly, the binding load applied to the power storage cells may be reduced.

A reduced binding load may bring about an adverse effect on the performance of power storage equipment. For example, fuel cells such as lithium ion batteries have a binding load range in which favorable performance can be offered. Binding with a light load falling below this binding load range may increase the distance between electrode layers in a fuel cell, resulting in reduced outputs.

The power storage device is manufactured at a normal temperature. Even with the stacked body being bound sufficiently tightly in a manufacturing stage, the binding load may be reduced under use in a low temperature environment, which may affect the performance of the power storage equipment. For example, the use of the power storage device in a low temperature environment may result in reduced outputs from the fuel cells.

An object of the present invention is to provide a power storage device which offers stable performance even at a low temperature.

A power storage device according to an aspect of the present invention includes a power storage cell for storing electric power, a binding member for sandwiching and binding the power storage cell, and an interposed member disposed in a region located between the binding member and the power storage cell. The binding member has a positive coefficient of thermal expansion at a temperature lower than a predetermined temperature. The interposed member is formed to increase a binding load applied to the power storage cell at a temperature lower than the predetermined temperature.

Preferably, in the above aspect, the interposed member has a negative coefficient of thermal expansion at a temperature lower than the predetermined temperature.

Preferably, in the above aspect, the interposed member includes a first component having a first coefficient of thermal expansion at a temperature lower than the predetermined temperature. The interposed member includes a second component having another coefficient of thermal expansion at a temperature lower than the predetermined temperature.

Preferably, in the above aspect, the interposed member includes a base and liquid. The base is made of a hydrophilic polymer or a porous member.

Preferably, in the above aspect, the interposed member includes a base and liquid. The liquid includes water.

Preferably, in the above aspect, the binding member and the power storage cell are stacked to constitute a stacked body. The interposed member is arranged to make contact with the binding member and the power storage cell.

Preferably, in the above aspect, the binding member and the power storage cell are stacked to constitute a stacked body. The interposed member is arranged to make contact with two of the power storage cells or two of the binding members.

A power storage device according to another aspect of the present invention includes a power storage cell for storing electric power, and a binding member for sandwiching and binding the power storage cell. The binding member has a negative coefficient of thermal expansion at a temperature lower than a predetermined temperature.

Preferably, in the above aspect, the binding member and the power storage cell are stacked to constitute a stacked body.

It is to be noted that two or more of the above-described structure may be combined as appropriate.

The present invention can provide a power storage device which offers stable performance even at a low temperature.

BEST MODES FOR CARRYING OUT THE INVENTION

First Embodiment

With reference to FIGS. 1 to 5, a power storage device according to a first embodiment will be described. The power storage device according to the present embodiment is a power storage module. The power storage module according to the present embodiment is a battery module including a plurality of fuel cells.

Figure 1:
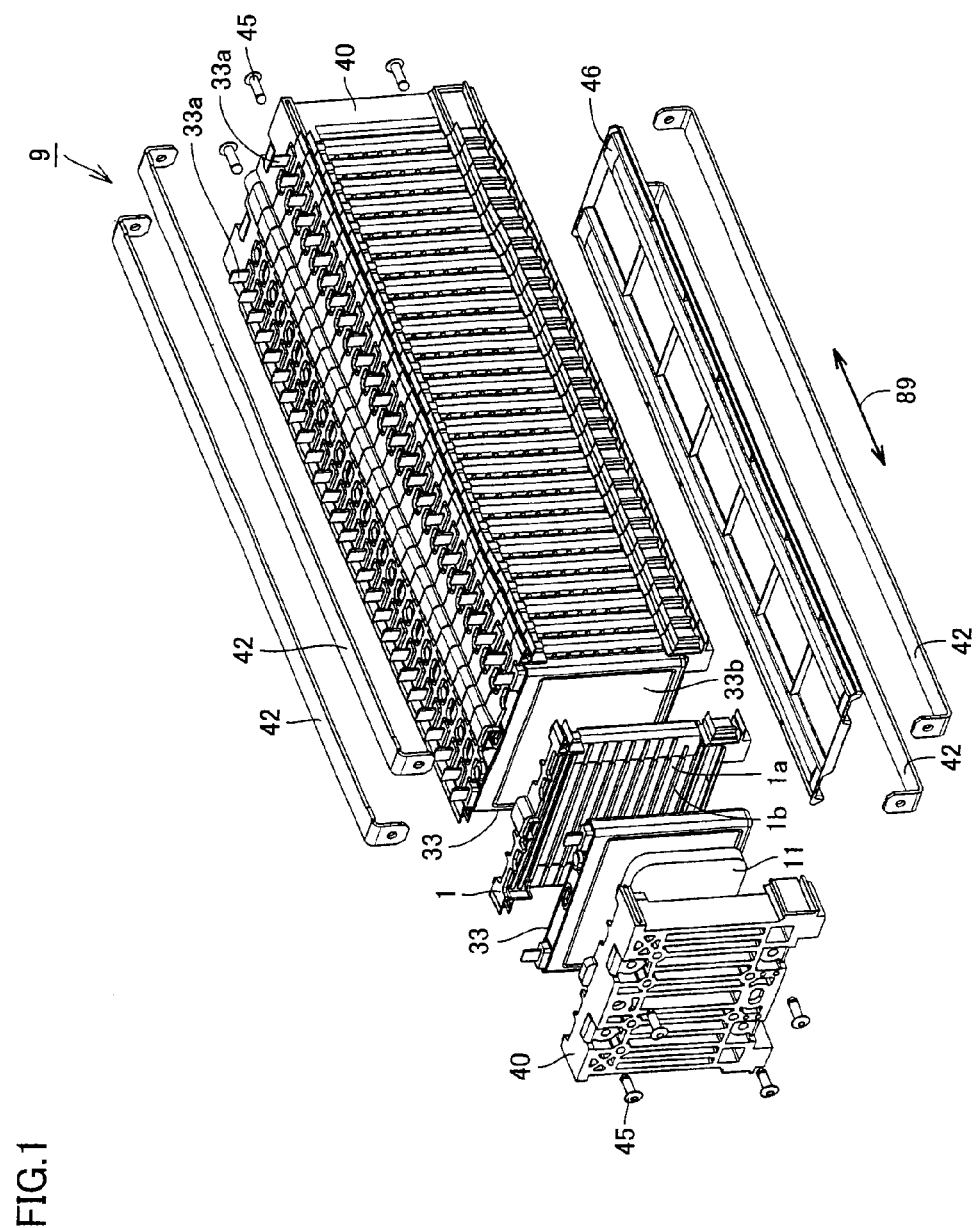
FIG. 1 is a schematic exploded perspective view of a battery module according to a first embodiment.

FIG. 1 is a schematic perspective view of the battery module according to the present embodiment. A battery module 9 according to the present embodiment is mounted on a hybrid vehicle powered by an internal combustion engine such as a gasoline engine and by a motor driven by a chargeable/dischargeable secondary battery.

Battery module 9 includes fuel cells 33 serving as power storage cells. Battery module 9 includes a stacked body in which plurality of fuel cells 33 are stacked. Plurality of fuel cells 33 are stacked in the direction of thickness of fuel cells 33. An arrow 89 indicates the direction in which fuel cells 33 are stacked.

Fuel cells 33 according to the present embodiment are rectangular fuel cells. Fuel cells 33 according to the present embodiment include lithium ion batteries. Plurality of fuel cells 33 are electrically connected to one another with bus bars not shown.

Battery module 9 includes binding members for binding fuel cells 33. The binding members according to the present embodiment include end plates 40 and battery holders 1. Battery holders 1 are each disposed between fuel cells 33 adjacent to each other in the direction in which fuel cells 33 are stacked. One fuel cell 33 is sandwiched between two battery holders 1 disposed at the opposite sides of the one fuel cell 33. Battery holders 1 are made of an electrically insulating material. Battery holders 1 according to the present embodiment are made of resin.

End plates 40 are disposed respectively at the opposite ends in the stack direction of the stacked body. End plates 40 according to the present embodiment are in the form of plates. End plates 40 according to the present embodiment are made of resin. End plates 40 are arranged to sandwich fuel cells 33 and battery holders 1 from the opposite sides in the stack direction.

The stacked body according to the present embodiment includes fuel cells 33, battery holders 1 and end plates 40. In the stacked body, fuel cells 33 and battery holders 1 are arranged alternately in the direction in which fuel cells 33 are stacked. The stacked body is mounted on an insulation tray 46.

Figure 2:
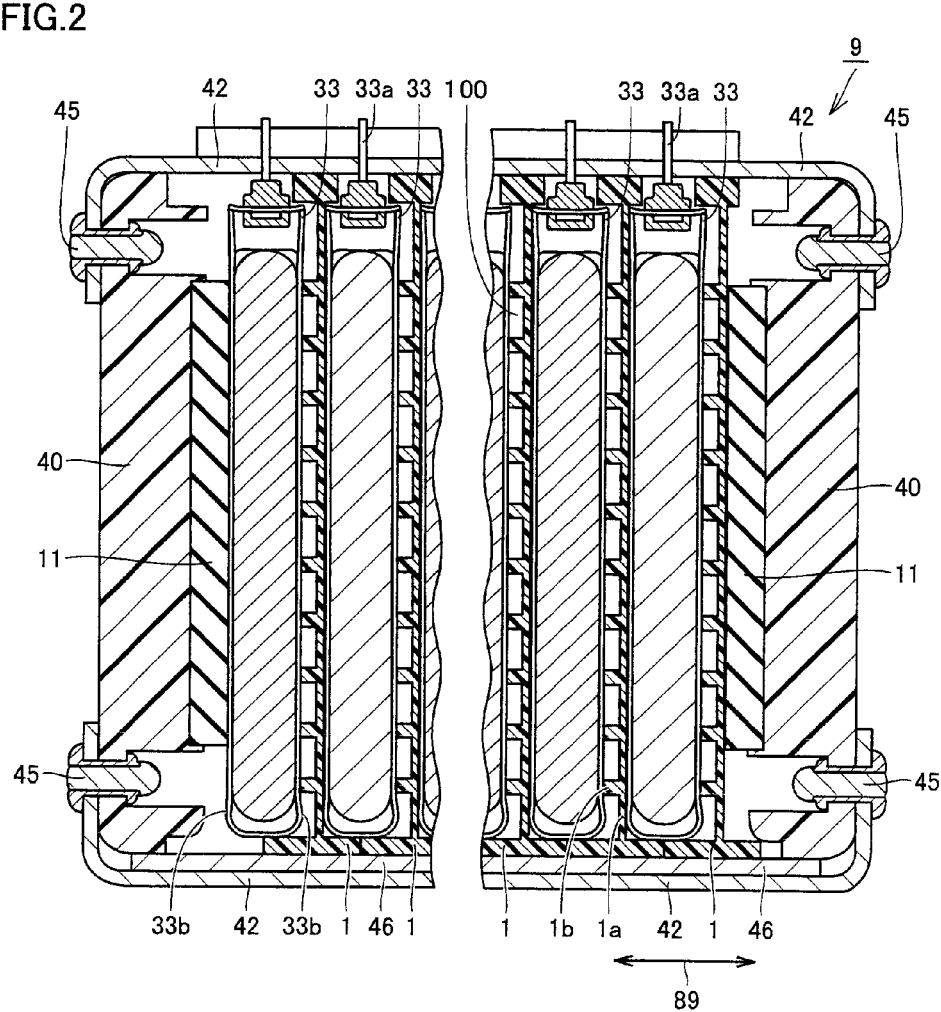
FIG. 2 is a schematic sectional view of the battery module according to the first embodiment.

FIG. 2 is a schematic sectional view of the battery module according to the present embodiment. FIG. 2 is a sectional view of the battery module taken along a plane extending in the longitudinal direction. As shown in FIGS. 1 and 2, fuel cells 33 according to the present embodiment each have an electrode 33a. Electrode 33a is formed to project from an end face of fuel cell 33.

Battery module 9 includes fixing bands 42 serving as fixing members. Fixing bands 42 according to the present embodiment are in the form of plates. Fixing bands 42 are arranged to extend longitudinally in the direction in which fuel cells 33 are stacked. Fixing bands 42 are arranged to fasten end plates 40, 40 to each other. In the present embodiment, the top and bottom of the battery module are fixed by fixing bands 42.

Fixing bands 42 are fixed to end plates 40 with rivets 45 serving as fastening members. Fixing bands 42 are arranged to bind fuel cells 33 in the stack direction. Fuel cells 33, battery holders 1 and end plates 40 are held integrally by fixing bands 42.

Fuel cells 33 each have a pair of surfaces 33b opposite to each other. Surfaces 33b are the largest area surface having the largest area among a plurality of surfaces of fuel cell 33. Plurality of fuel cells 33 are arranged such that respective surfaces 33b, 33b are substantially in parallel to one another.

Battery holders 1 each have a base portion 1a as a plate-like portion. Battery holders 1 each have ribs 1b. Ribs 1b are formed on a surface of base portion 1a opposite to fuel cell 33. Ribs 1b abut surface 33b of fuel cell 33. Fuel cell 33 is sandwiched between and makes contact with ribs 1b of one battery holder 1 and base portion 1a of an opposite battery holder 1.

Fuel cells 33 according to the present embodiment are cooled by air qualified as fluid. Formed between ribs 1b are flow passages 100 through which cooling air for cooling fuel cells 33 flows. Fuel cells 33 are cooled by the flow of air along surfaces 33b of fuel cells 33. Fuel cells 33 are cooled by the air passing through flow passages 100.

Battery module 9 according to the present embodiment includes interposed members 11 serving as first interposed members. Interposed members 11 according to the present embodiment make contact with end plates 40 and fuel cells 33. Interposed members 11 according to the present embodiment are disposed in the stacked body of end plates 40, fuel cells 33 and battery holders 1. Interposed members 11 are disposed respectively at the ends of the stacked body in the stack direction of the stacked body.

Figure 3:
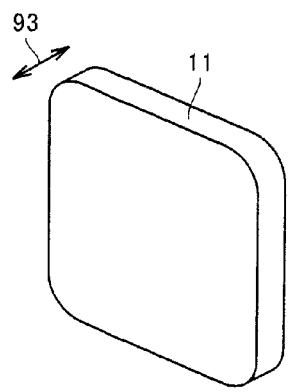
FIG. 3 is a schematic perspective view of a first interposed member according to the first embodiment.

FIG. 3 is a schematic perspective view of a first interposed member according to the present embodiment. Interposed member 11 according to the present embodiment has a rectangular parallelepiped shape. Interposed member 11 according to the present embodiment has a structure in which a base made of hydrophilic polymer impregnated with water as fluid is sealed in a laminated film.

The hydrophilic polymer includes high polymers containing hydrophilic functional groups or crosslinks of these polymers. The hydrophilic polymers include polyacrylic acid, polyvinyl alcohol, polyethylene glycol or polyacrylamide, for example.

With reference to FIGS. 1 and 2, in a manufacturing step of the battery module according to the present embodiment, battery holders 1, end plates 40 and fuel cells 33 are stacked, and then compressed in the stack direction indicated by arrow 89 to be applied with a load. With the load being applied in the stack direction, the stacked body is fixed by fixing bands 42.

When applying a load, constant-size binding, for example, is performed in such a manner that the stacked body has a constant length in the longitudinal direction.

The step of assembling the stacked body is performed in a factory or the like, which is in a normal temperature environment. For example, the step is performed in an environment of about 25° C. Battery module 9 is bound under a load falling within a binding load range in which favorable performance can be offered.

The power storage device according to the present embodiment may be used in a low temperature environment. For example, a hybrid vehicle equipped with battery module 9 may be used in a very cold area. Battery module 9 is placed in an environment of −30° C., for example.

The binding members according to the present embodiment are made of resin, and have a positive coefficient of thermal expansion to expand in volume as the temperature rises. As the temperature drops, the binding members contract to be reduced in thickness in the stack direction indicated by arrow 89. This causes a reduction in the binding load applied to fuel cells 33.

Interposed members 11 according to the present embodiment contain water in the inside, sealed in the laminated film. Water has the minimum volume at +4° C. as a predetermined temperature. As the temperature drops within the range of 0° C. to 4° C., water has a negative coefficient of thermal expansion to expand in volume. At 0° C. or below, water solidifies to expand in volume. Specifically, the volume increases as water turns into ice, which exhibits a substantially negative coefficient of thermal expansion.

Interposed members 11 expand in volume as the temperature drops below +4° C. to be increased in thickness in the stack direction of the stacked body. Interposed members 11 are formed to increase the binding load applied to fuel cells 33 at a temperature lower than +4° C. Therefore, fuel cells 33 can be bound under an appropriate binding load even at a low temperature, which can prevent fuel cells 33 from degrading in performance.

As described above, the interposed members according to the present embodiment are formed to increase the binding load applied to the power storage cells at a temperature lower than the predetermined temperature. The interposed members according to the present embodiment have a negative coefficient of thermal expansion at a temperature lower than the predetermined temperature. Specifically, the interposed members are formed to expand in volume as the temperature drops below the predetermined temperature. This enables compensation for the reduction in binding load associated with the contraction of the binding members caused by temperature drops, so that the binding load applied to the power storage cells can be maintained high even at a low temperature. The load is prevented from falling below the binding load range in which the power storage cells offer favorable performance, so that stable driving can be achieved.

The interposed members according to the present embodiment contain liquid and a base. With this structure, interposed members having a negative coefficient of thermal expansion can be readily implemented. Although water is used as the liquid in the present embodiment, this is not a limitative example. Another type of liquid may be used.

For example, water containing a supporting electrolyte such as sodium chloride may be used as the liquid. Dissolving impurities such as a supporting electrolyte in water allows the solidification point to be lowered, enabling adjustment of the temperature of volume expansion caused by solidification. For example, water containing no impurity mixed therein expands significantly at approximately 0° C. However, increasing the concentration of the supporting electrolyte allows lowering of the temperature of volume expansion caused by solidification.

Although the above-described interposed members include the base of hydrophilic polymer impregnated with liquid, this is not a limitative example. As the interposed members, any member may be used that is formed to increase the binding load applied to the power storage cells at a temperature lower than the predetermined temperature.

Figure 4:
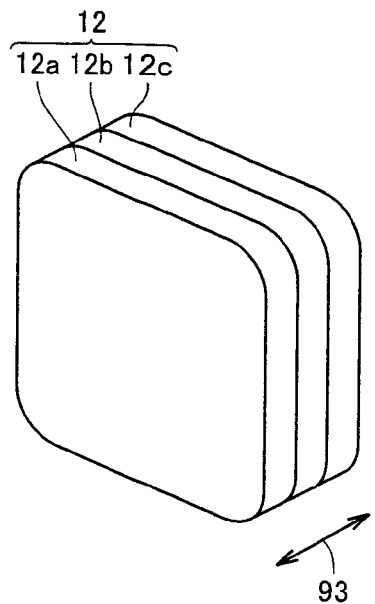
FIG. 4 is a schematic perspective view of a second interposed member according to the first embodiment.

FIG. 4 is a schematic perspective view of a second interposed member according to the present embodiment. The second interposed member includes a plurality of components stacked one upon another. An interposed member 12 serving as the second interposed member includes components 12*a*, 12*b* and 12*c* stacked one upon another. Respective components 12*a* to 12*c* are in the form of plates. Respective components 12*a* to 12*c* are arranged such that their largest area surfaces having the largest area make contact with one another.

Components 12*a* to 12*c* according to the present embodiment are each formed of a base of hydrophilic polymer impregnated with supporting-electrolyte-containing water and sealed in a laminated film. Respective components 12*a* to 12*c* are formed to have different concentrations of supporting electrolyte therein from one another. The supporting electrolyte within component 12*a* is formed to have a concentration higher than that within component 12*b*. The supporting electrolyte within component 12*b* is formed to have a concentration higher than that within component 12*c*. In other words, the supporting electrolyte within component 12*a* has the highest concentration, and the supporting electrolyte within component 12*c* has the lowest concentration. Respective components 12*a* to 12*c* have different coefficients of thermal expansion from one another.

As the temperature around interposed member 12 drops, component 12*c* having the lowest concentration of supporting electrolyte solidifies at approximately 0° C. Component 12*b* solidifies at a temperature lower than component 12*c* does. Component 12*a* solidifies at a temperature lower than component 12*b* does. In this manner, since components 12*a* to 12*c* have different solidification points from one another, the temperature of volume expansion caused by solidification can be varied among the respective components. Stacking a plurality of components having different concentrations of supporting electrolyte from one another allows a gradual volume increase of the interposed member as the temperature drops.

For example, the binding members made of resin are gradually reduced in volume as the temperature drops. Stacking a plurality of components having different concentrations of supporting electrolyte to constitute an interposed member allows a gradual increase in length of the interposed member in correspondence with the contraction of the binding members. As a result, a more appropriate load can be applied to the power storage cells in accordance with temperature variation. The second interposed member can be prevented from an abrupt volume expansion at a predetermined temperature which will cause a great load to be applied to the fuel cells.

Although the second interposed member according to the present embodiment has a stack of three rectangular parallelepiped components, this is not a limitative example. The interposed member may have a stack of any number of components of any shape.

Figure 5:
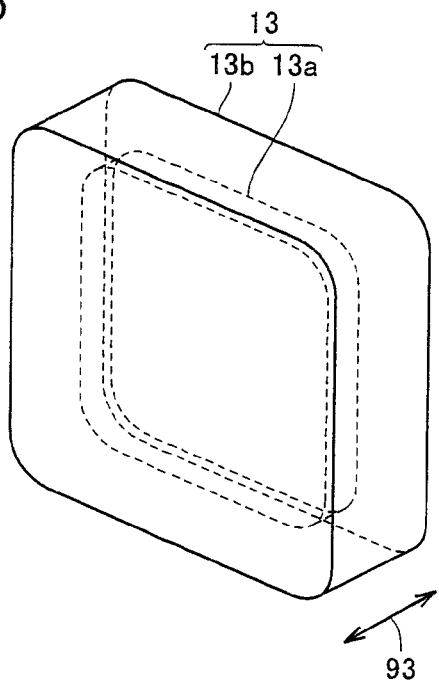
FIG. 5 is a schematic perspective view of a third interposed member according to the first embodiment.

FIG. 5 is a schematic perspective view of a third interposed member according to the present embodiment. An interposed member 13 serving as the third interposed member includes a component 13*b* and a component 13*a* disposed within component 13*b*. Component 13*a* has a base of hydrophilic polymer impregnated with supporting-electrolyte-containing water and a laminated film in which the base is sealed. Component 13b has a base of hydrophilic polymer impregnated with supporting-electrolyte-containing water and a laminated film sealing the base to surround component 13a. The supporting electrolyte within component 13a is formed to have a lower concentration than that present external to component 13a.

In interposed member 13, as the temperature drops, water within component 13a solidifies at approximately 0° C. to expand. Further, the supporting-electrolyte-containing water present within component 13b and external to component 13a solidifies at a lower temperature to expand. Embedding one component within the other component having a different concentration of supporting electrolyte to constitute an interposed member allows a gradual volume increase of the interposed member as the temperature drops. As a result, a more appropriate load can be applied to the power storage cells in accordance with temperature variation. The third interposed member can be prevented from an abrupt volume expansion at a predetermined temperature which will cause a great load to be applied to the fuel cells.

Although the third interposed member according to the present embodiment has two rectangular parallelepiped components with one embedded within the other, this is not a limitative example. Any number of components of any shape may be embedded within one another.

The results of a first test verifying the performance of the power storage device according to the present embodiment will now be described. In the test, a rectangular lithium ion batteries were used as fuel cells. The fuel cells were sandwiched between and bound by two metal plates serving as binding members, and the metal plates were applied with a load. As the metal plates, stainless plates were used.

In the test, the lithium ion batteries were charged to set an output voltage at a predetermined voltage, and then a constant-current discharge was conducted for 10 seconds. A voltage after the constant-current discharge was read to calculate a voltage drop from the initial predetermined voltage. A smaller voltage drop represents a smaller and superior inner resistance. The fuel cells were bound under the condition that the voltage drop indicated the same value at 25° C. as a normal temperature environment. The fuel cells were then placed in an environment of −30° C. for four hours using a constant temperature bath, following which the same measurements were made.

In the test, a resistance obtained at −30° C. was divided by a resistance obtained at 25° C., and the resultant coefficient was defined as a resistance increase rate. A smaller resistance increase rate indicates that the outside air temperature causes less output variation, resulting in stable driving even when the outside air temperature drops.

In the first test, a base impregnated with liquid was used for interposed members. In the first test, interposed members each having a base of hydrophilic polymer impregnated with water or supporting-electrolyte (NaCl)-containing water were tested. Comparative examples were also tested. The results of the first test are shown in Table 1.

TABLE 1

| | Interposed Member | Resistance Increase Rate |
|---|---|---|
| Comparative Example 1 | None | 45.2 |
| Comparative Example 2 | Crosslinked polyacrylic acid polymer impregnated with 10% by weight of cyclohexane, and sealed in a laminated film | 46.7 |
| Example 1 | Crosslinked polyacrylic acid polymer impregnated with 10% by weight of water, and sealed in a laminated film | 42.4 |
| Example 2 | Crosslinked polyacrylic acid polymer impregnated with 10% by weight of 5% NaCl water, and sealed in a laminated film | 41.1 |
| Example 3 | Polyethylene glycol impregnated with 10% by weight of water, and sealed in a laminated film | 42.3 |
| Example 4 | Polyethylene glycol impregnated with 10% by weight of 5% NaCl water, and sealed in a laminated film | 42.4 |

In Comparative Example 1, fuel cells were sandwiched between and bound by metal plates without providing any interposed member.

In Comparative Example 2, a crosslinked polyacrylic acid polymer serving as a base of the interposed member impregnated with 10% by weight of cyclohexane as liquid was used. This interposed member was sandwiched between and bound by a metal plate and a fuel cell.

The composition of base and liquid of the interposed member in each of Examples 1 to 4 is as shown in Table 1. For example, in Example 1, a crosslinked polyacrylic acid polymer serving as a base of the interposed member impregnated with 10% by weight of water as liquid is used. In Examples 1 to 4, each interposed member was sandwiched between and bound by a metal plate and a fuel cell.

The results of the first test show that Examples 1 to 4 provide resistance increase rates lower than and superior to those attained in Comparative Examples 1 and 2. It is shown that the arrangement of the interposed member having a negative coefficient of thermal expansion between a fuel cell and a metal plate achieves stable driving even when the outside air temperature drops. A comparison between Comparative Example 2 and Example 1 shows that the use of water as liquid allows a reduction in resistance increase rate.

The results of a second test conducted on the third interposed member (cf. FIG. 5) among the interposed members according to the present embodiment will now be described. The second test was conducted on the interposed member with one component embedded within the other. The results of the second test are shown in Table 2.

TABLE 2

| | Interposed Member | Resistance Increase Rate |
|---|---|---|
| Comparative Example 1 | None | 45.2 |
| Comparative Example 2 | Crosslinked polyacrylic acid polymer impregnated with 10% by weight of cyclohexane, and sealed in a laminated film | 46.7 |
| Example 5 | Crosslinked polyacrylic acid polymer impregnated with 10% by weight of water, sealed in a laminated film, further surrounded by crosslinked polyacrylic acid polymer impregnated with 10% by weight of 5% NaCl water, and sealed in a laminated film | 41.4 |

In Example 5, a base of crosslinked polyacrylic acid polymer impregnated with 10% by weight of water is sealed in a laminated film to constitute an inner component. Further, the inner component is surrounded by a crosslinked polyacrylic acid polymer impregnated with 10% by weight of 5% NaCl water, and sealed in a laminated film to constitute an outer component.

In Example 5, the supporting electrolyte within the outer component was formed to have a higher concentration than that within the inner component. With the composition of Example 5, water within the inner component solidifies first as the temperature drops, and water at the outer side of the inner component then solidifies.

The results of the second test show that Example 5 provides a resistance increase rate lower than those attained in Comparative Examples 1 and 2, which results in favorable performance.

In the present embodiment, the binding members for binding the fuel cells have a positive coefficient of thermal expansion, and the interposed members have a negative coefficient of thermal expansion. However, these are not limitative examples. The binding members may have a negative coefficient of thermal expansion at a temperature lower than a predetermined temperature. For example, one of a plurality of battery holders may be formed to have a negative coefficient of thermal expansion. With such a structure, a power storage device can also be provided which achieves stable driving at a low temperature.

Although the interposed members according to the present embodiment have a rectangular parallelepiped shape, this is not a limitative example, and any shape can be adopted. For example, a plurality of interposed members having a cylindrical shape may be disposed in a region between binding members and power storage cells.

Although the interposed members according to the present embodiment are each disposed between an end plate and a fuel cell, this is not a limitative example. Each interposed member only needs to be disposed in a region between any binding member and any power storage cell. For example, in a stacked body of battery holders and fuel cells, each interposed member may be disposed between fuel cells. Alternatively, each interposed member may be disposed between battery holders. Still alternatively, each interposed member may be disposed between a battery holder and a fuel cell.

Although, in the present embodiment, two interposed members are provided respectively at the opposite ends of the stacked body of fuel cells, battery holders and end plates, this is not a limitative example. Any number of interposed members may be provided.

Although the battery holders and end plates according to the present embodiment are each made of resin, this is not a limitative example. For example, they may be made of metal.

Although the fuel cells according to the present embodiment are lithium ion batteries, this is not a limitative example. The present invention is applicable to a power storage device including any power storage cells having the function of storing electric power. For example, the power storage cells may include capacitors.

Although, in the present embodiment, the power storage device to be mounted on a vehicle is shown by way of example, this is not a limitative example. The present invention may be applied to any power storage device. For example, the present invention may be applied to a power storage device to be mounted on any moving body. Alternatively, the present invention may be applied to a power storage device to be fixed to any unmoving fixity.

Second Embodiment

With reference to FIG. 3, a power storage device according to a second embodiment will now be described. The power storage device according to the present embodiment includes a battery module. Similarly to the first embodiment, the battery module includes a stacked body in which binding members and fuel cells are stacked, and interposed members are disposed within the stacked body. The battery module according to the present embodiment is different from that of the first embodiment in the structure of the interposed members.

The interposed members according to the present embodiment have a contour similar to that of interposed member 11 shown in FIG. 3. The interposed members according to the present embodiment include a porous member as a base. The porous member includes a member made of zeolite, activated carbon or the like. Zeolite includes synthetic zeolite, natural zeolite and artificial zeolite, for example. The interposed members according to the present embodiment include a base made of zeolite and liquid.

The porous member has pores whose flow passages are small in cross-sectional area. Liquid infiltrated into the pores solidifies at a temperature lower than an ordinary solidification point. The use of the porous member as the base allows a gradual solidification of the liquid as the temperature drops. Accordingly, the interposed members expand gradually. Specifically, as the temperature drops, liquid present external to the pores solidifies, and liquid present within the pores then solidifies, which results in a gradual expansion as a whole.

The interposed members according to the present embodiment expand gradually as the temperature drops, which allows a gradual application of a load to the fuel cells in correspondence with contraction of the binding members associated with temperature drops. The interposed members according to the present embodiment can be prevented from an abrupt volume expansion at a predetermined temperature which will cause a great load to be applied to the fuel cells.

The results of a third test verifying the performance of the power storage device according to the present embodiment will now be described. The third test was conducted in a similar manner to that of the tests conducted in the first embodiment. The results of the third test are shown in Table 3.

TABLE 3

|  | Interposed Member | Resistance Increase Rate |
|---|---|---|
| Comparative Example 1 | None | 45.2 |
| Comparative Example 2 | Crosslinked polyacrylic acid polymer impregnated with 10% by weight of cyclohexane, and sealed in a laminated film | 46.7 |
| Example 6 | Synthetic zeolite impregnated with 10% by weight of water, and sealed in a laminated film | 43.2 |
| Example 7 | Synthetic zeolite impregnated with 10% by weight of 5% NaCl water, and sealed in a laminated film | 42.9 |

For the interposed members in Examples 6 and 7, bases made of synthetic zeolite are used, and water or NaCl water is used as liquid. Comparative Examples 1 and 2 are the same as Comparative Examples 1 and 2 in the first embodiment.

The results of the third test show that Examples 6 and 7 both provide resistance increase rates lower than those attained in Comparative Examples 1 and 2. That is, it is shown that more stable driving can be offered than in the comparative examples even at a low temperature.

The remaining structure, action and effects are similar to those of the first embodiment, and the same description will not be repeated here.

Third Embodiment

Figure 6:
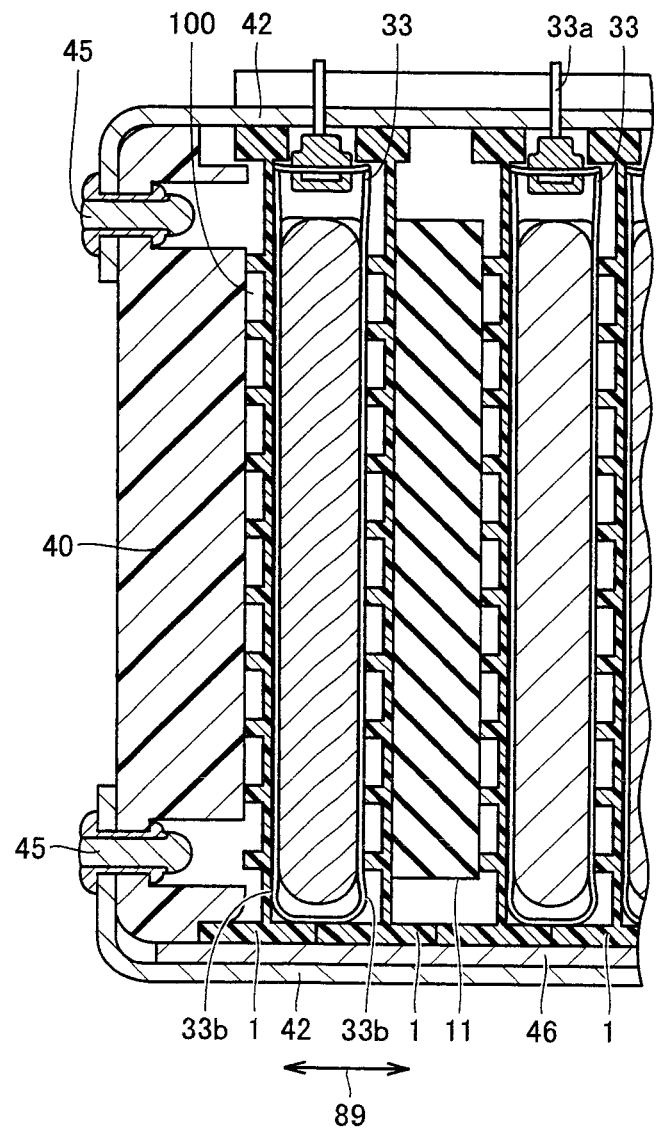
FIG. 6 is a schematic sectional view of a first battery module according to a third embodiment.
Figure 7:
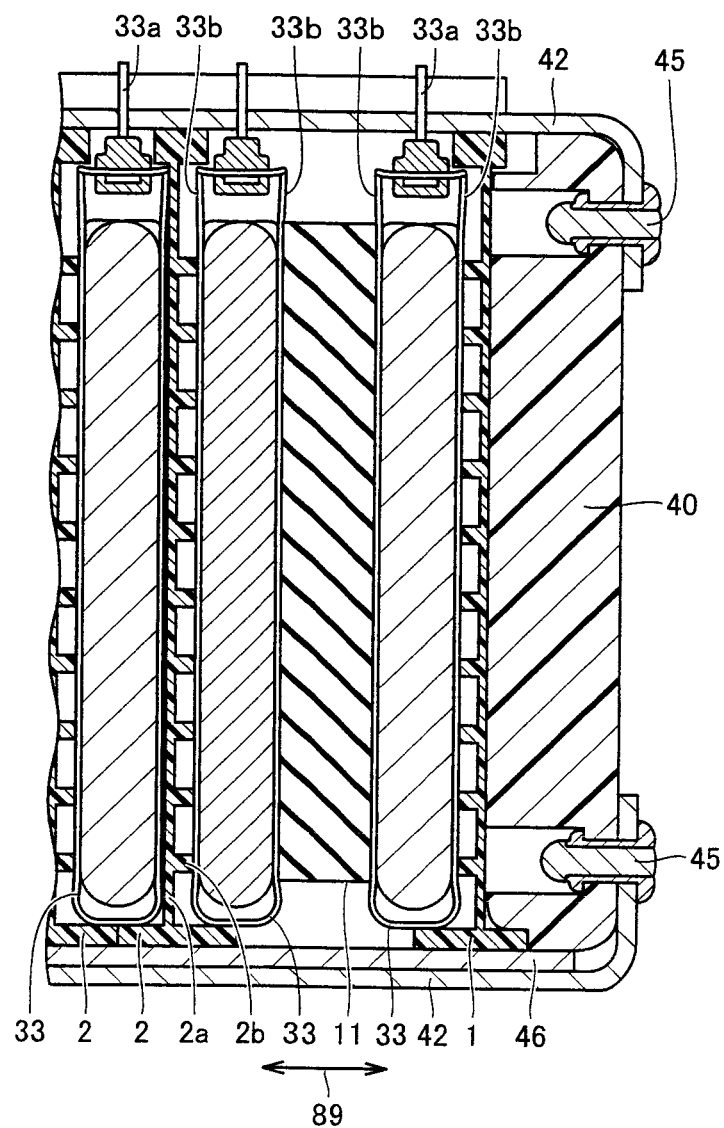
FIG. 7 is a schematic sectional view of a second battery module according to the third embodiment.

With reference to FIGS. 6 and 7, a power storage device according to a third embodiment will now be described. The power storage device according to the present embodiment includes a battery module. The battery module according to the present embodiment is different from that of the first embodiment in the position at which interposed members are disposed.

FIG. 6 is a schematic sectional view of a first battery module according to the present embodiment. The first battery module according to the present embodiment includes interposed member 11. Interposed member 11 is disposed between two battery holders 1. Interposed member 11 is disposed in a space located between battery holders 1 in the stacked body of end plates 40, fuel cells 33 and battery holders 1. Interposed member 11 has front and back surfaces making contact with battery holders 1, respectively.

In this manner, in the first battery module according to the present embodiment, the interposed member is arranged to make contact with two binding members in the stacked body of binding members and fuel cells.

FIG. 7 is a schematic sectional view of a second battery module according to the present embodiment. The second battery module includes battery holders 1 and 2 serving as binding members. Battery holder 2 has a base portion 2a and ribs 2b. Ribs 2b make contact with surface 33b of fuel cell 33 to constitute flow passages of cooling air.

The second battery module includes interposed member 11. Interposed member 11 is disposed between fuel cells 33. Interposed member 11 is sandwiched between two fuel cells 33. Interposed member 11 has front and back surfaces making contact with fuel cells 33, respectively.

The second battery module according to the present embodiment is arranged such that the interposed member makes contact with two fuel cells in the stacked body of binding members and fuel cells.

The power storage device according to the present embodiment can also achieve stable driving at a low temperature, similarly to the first embodiment.

The remaining structure, action and effects are similar to those of the first embodiment, and the same description will not be repeated here.

Fourth Embodiment

Figure 8:
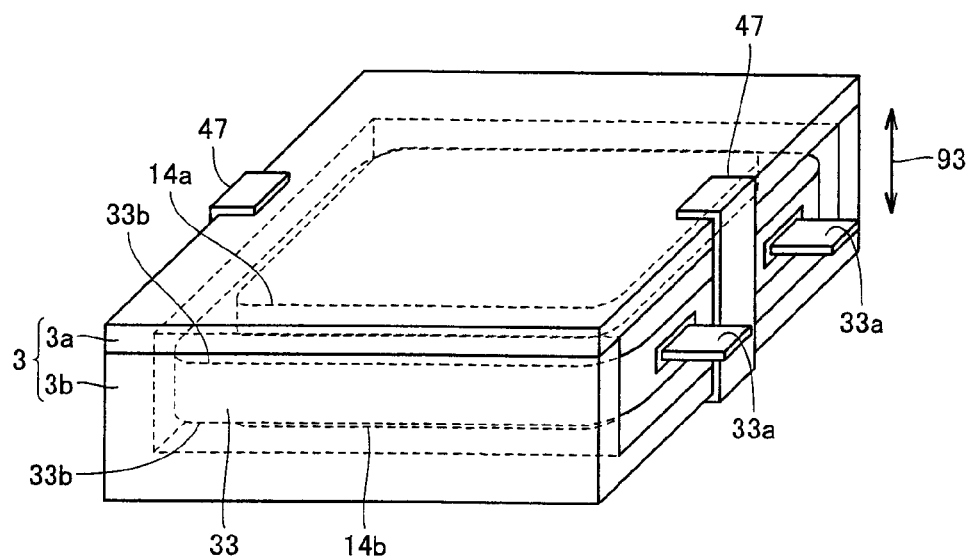
FIG. 8 is a schematic perspective view of a power storage device according to a fourth embodiment.
Figure 9:
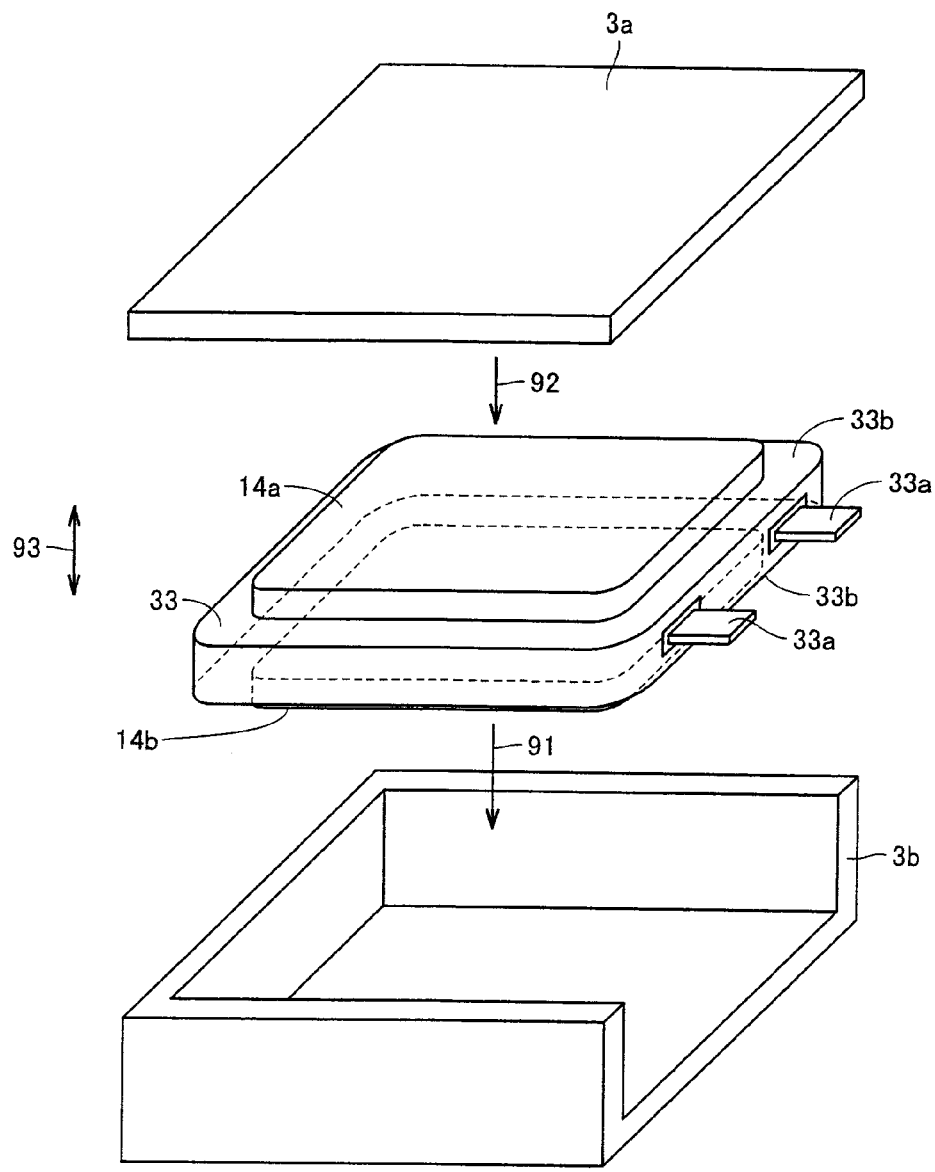
FIG. 9 is a schematic exploded perspective view of the power storage device according to the fourth embodiment.

With reference to FIGS. 8 and 9, a power storage device according to a fourth embodiment will now be described.

FIG. 8 is a schematic perspective view of the power storage device according to the present embodiment. FIG. 9 is a schematic exploded perspective view of the power storage device according to the present embodiment. The power storage device according to the present embodiment includes a single fuel cell 33 serving as a power storage cell. Fuel cell 33 has a rectangular parallelepiped shape.

The power storage device according to the present embodiment includes a battery case 3 serving as a binding member for binding fuel cell 33. Fuel cell 33 is disposed in battery case 3. Battery case 3 has a lid member 3a and a receiving member 3b. Fuel cell 33 is placed in a space surrounded by receiving member 3b and lid member 3a.

The power storage device according to the present embodiment includes a pair of interposed members 14a and 14b. Interposed members 14a and 14b according to the present embodiment are formed to have a negative coefficient of thermal expansion at a temperature lower than a predetermined temperature. Interposed members 14a and 14b according to the present embodiment each have a hydrophilic polymer impregnated with water and sealed in a laminated film.

Interposed members 14a and 14b are arranged to make contact with surfaces 33b of fuel cell 33 having the largest area, respectively. Interposed members 14a and 14b are disposed on the front and back surfaces of fuel cell 33, respectively. Interposed member 14b is sandwiched between fuel cell 33 and receiving member 3b. Interposed member 14a is sandwiched between fuel cell 33 and lid member 3a.

The power storage device according to the present embodiment includes fixing bands 47 serving as fixing members. Fixing bands 47 are formed to bind lid member 3a and receiving member 3b in the direction of thickness of fuel cell 33. Fixing bands 47 are arranged to extend in the direction of thickness of fuel cell 33. An arrow 93 indicates the binding direction.

In assembling the power storage device according to the present embodiment, fuel cell 33 is placed in the hollow of receiving member 3b with interposed member 14b interposed therebetween, as indicated by an arrow 91. Then, as indicated by an arrow 92, interposed member 14a placed on front surface 33b of fuel cell 33 is pressed by lid member 3a. Fuel cell 33 is sandwiched between the pair of interposed members 14a and 14b disposed on the front and back surfaces, respectively, to be applied with a load.

With lid member 3a being pressed, fixing bands 47 serving as the fixing members bind battery case 3 in the direction of thickness of fuel cell 33. Fixing bands 47 fix lid member 3a to receiving member 3b while applying a load.

In the power storage device according to the present embodiment, interposed members 14a and 14b expand as the temperature drops, so that an appropriate load can be applied to fuel cell 33. Therefore, the power storage device according to the present embodiment achieves stable driving at a low temperature.

The remaining structure, action and effects are similar to those of the first embodiment, and the same description will not be repeated here.

Fifth Embodiment

Figure 10:
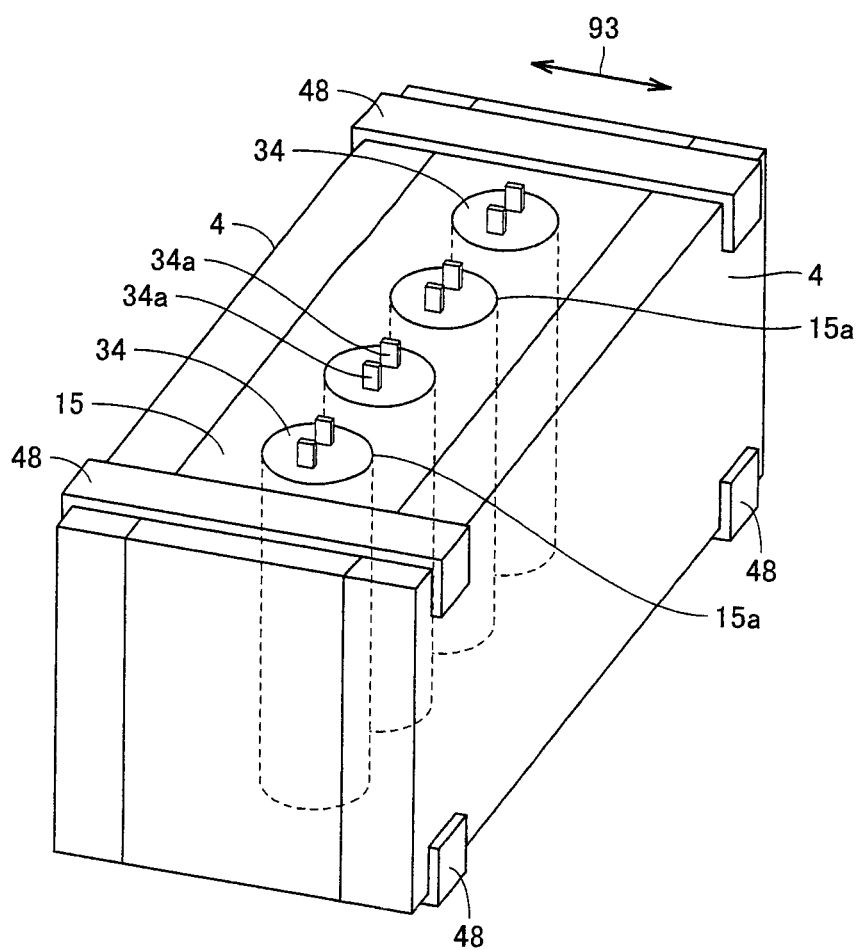
FIG. 10 is a schematic perspective view of a power storage device according to a fifth embodiment.

With reference to FIG. 10, a power storage device according to a fifth embodiment will now be described.

FIG. 10 is a schematic perspective view of a power storage device according to the present embodiment. The power storage device according to the present embodiment includes fuel cells 34. Fuel cells 34 have a cylindrical shape. Fuel cells 34 include electrodes 34a. Electrodes 34a are formed to project from the top face of the cylindrical contour of fuel cells 34.

The power storage device according to the present embodiment includes plate members 4 serving as binding members for binding fuel cells 34. Plate members 4 are in the form of plates. Plate members 4 are arranged to sandwich fuel cells 34 with an interposed member 15 located therebetween.

The power storage device according to the present embodiment includes interposed member 15. Interposed member 15 is formed to surround fuel cells 34 circumferentially. Interposed member 15 is disposed between fuel cells 34 and plate members 4. Interposed member 15 according to the present embodiment has insertion holes 15a. Insertion holes 15a are formed to fit the contour of fuel cells 34. Fuel cells 34 are located in insertion holes 15a, respectively.

Interposed member 15 according to the present embodiment is formed by impregnating a base of hydrophilic polymer with water, and sealing the base with a laminated film. Interposed member 15 is formed to have a negative coefficient of thermal expansion at a temperature lower than a predetermined temperature.

In the assembling step of the power storage device according to the present embodiment, fuel cells 34 are placed in insertion holes 15a of interposed member 15, respectively. Interposed member 15 is then sandwiched between plate members 4. At this stage, a load is applied in the direction indicated by arrow 93. Fixing bands 48 bind plate members 4 to each other while applying a load in the direction that plate members 4 approach each other.

The power storage device according to the present embodiment also achieves stable driving at a low temperature.

Although, in the present embodiment, a load is applied only in a single direction, this is not a limitative example. A load can be applied in any directions. For example, additional plate members may be provided respectively at the opposite ends in the direction perpendicular to the above-mentioned single direction, and a load may be applied further in the direction perpendicular to the above-mentioned single direction.

The remaining structure, action and effects are similar to those of the first embodiment, and the same description will not be repeated here.

In the aforementioned respective drawings, like or corresponding parts are denoted by like reference characters. The above-described respective embodiments may be combined as appropriate.

It should be construed that embodiments disclosed herein are by way of illustration in all respects, not by way of limitation. It is intended that the scope of the present invention is defined by claims, not by the description above, and includes all modifications equivalent in meaning and scope to the claims.

INDUSTRIAL APPLICABILITY

The present invention can provide a power storage device that offers stable performance even at a low temperature.

The invention claimed is:

1. A power storage device comprising:
a plurality of stacked power storage cells for storing electric power, wherein each power storage cell is a lithium ion battery and includes:
a power storage component disposed within a case having a pair of surfaces substantially parallel to each other; and
an electrode fixed to said case,
wherein a plurality of the power storage cells are stacked in a direction of thickness of the power storage cells;
a binding member for sandwiching and binding said plurality of stacked power storage cells; and
an interposed member disposed in a region located between said binding member and said plurality of stacked power storage cells,
said binding member having a positive coefficient of thermal expansion at a temperature lower than a predetermined temperature, said binding member having a pair of end plates disposed respectively at opposite ends of the plurality of stacked power storage cells, and said binding member applying a load to the plurality of stacked power storage cells in the direction of thickness,
said interposed member being formed to increase a binding load applied to said plurality of stacked power storage cells at a temperature lower than said predetermined temperature.

2. The power storage device according to claim 1, wherein said interposed member has a negative coefficient of thermal expansion at a temperature lower than said predetermined temperature.

3. The power storage device according to claim 2, wherein said interposed member includes
a first component having a first coefficient of thermal expansion at a temperature lower than said predetermined temperature, and
a second component having a second coefficient of thermal expansion at a temperature lower than said predetermined temperature.

4. The power storage device according to claim 1, wherein said interposed member includes a base and liquid, and said base is made of a hydrophilic polymer or a porous member.

5. The power storage device according to claim 1, wherein said interposed member includes a base and liquid, and said liquid includes water.

6. The power storage device according to claim 1, wherein
said binding member and said power storage cells are stacked to constitute a stacked body, and
said interposed member is arranged to make contact with said binding member and said power storage cell.

7. The power storage device according to claim 1, wherein
said binding member and said power storage cells are stacked to constitute a stacked body, and
said interposed member is arranged to make contact with two of said power storage cells or two of said binding members.

\* \* \* \* \*